United States Patent [19]
de Vries

[11] Patent Number: 4,900,226
[45] Date of Patent: Feb. 13, 1990

[54] CONTROL SYSTEM FOR SYNCHROPHASING AIRCRAFT PROPELLERS

[75] Inventor: Luitzen de Vries, Amstelveen, Netherlands

[73] Assignee: Fokker Aircraft B.V., Netherlands

[21] Appl. No.: 122,944

[22] Filed: Nov. 19, 1987

[30] Foreign Application Priority Data

Oct. 28, 1987 [GB] United Kingdom ............... 8725268

[51] Int. Cl.⁴ .......................................... B64C 11/50
[52] U.S. Cl. ....................................... 416/34; 416/35
[58] Field of Search ................................. 416/33–35

[56] References Cited

U.S. PATENT DOCUMENTS

| | | | |
|---|---|---|---|
| 2,847,617 | 8/1958 | Clark | 416/34 X |
| 2,877,855 | 3/1959 | Farkas | 416/34 |
| 2,878,427 | 3/1959 | Best | 416/34 X |
| 3,007,529 | 11/1961 | Brockert et al. | 416/34 |
| 3,066,741 | 12/1962 | Barnes | 416/34 |
| 3,589,832 | 6/1971 | Harris et al. | 416/34 |
| 4,245,955 | 1/1981 | Lambertson | 416/34 |
| 4,653,981 | 3/1987 | Harner et al. | 416/34 |
| 4,659,283 | 4/1987 | Niessen et al. | 416/34 |

FOREIGN PATENT DOCUMENTS

| | | | |
|---|---|---|---|
| 472689 | 4/1951 | Canada | 416/34 |
| 664628 | 6/1963 | Canada | 416/34 |

Primary Examiner—Everette A. Powell, Jr.
Attorney, Agent, or Firm—Handal & Morofsky

[57] ABSTRACT

Control system for synchrophasing the propellers of an aircraft, each propeller provided with a blade pitch controller for controlling the blade angle of the propeller, the systen containing for each propeller a control loop, comprising: a revolution rate controller, means for determining the blade passing frequency, an adjustable propeller revolution rate reference source supplying a revolution rate setpoint control signal, comparator means for comparing the blade passing frequency with said setpoint to generate an error signal for the revolution rate controller. The control system comprises furthermore for each propeller: means for determining the position of the propeller blades, a reference signal source, adjustable means changing the phase reference signal a comparator to compare the sensed position of the propeller blades with said phase reference signal, providing a control signal to be combined with the output signal of the revolution controller, and that the system furthermore comprises means to adjust said propeller revolution rate reference source and said phase reference signal deriving means such that for each revolution rate setpoint a predetermined mutual phase relationship between the propellers are maintained.

18 Claims, 4 Drawing Sheets

CONTROL SYSTEM FOR SYNCHROPHASING AIRCRAFT PROPELLERS

The invention relates to a control system for controlling the speed of the propellers of an aircraft.

The major source for the noise field in the passenger compartment of aircraft with propeller engines or propfan engines is the propulsion system. The pressure fields generated by the propellers excite the hull of the aircraft in two ways: in a direct way against the side wall of the hull and in an indirect way by excitation of the wings and ailerons. The directly or indirectly generated vibrations in the hull side wall and in the ailerons will propagate through the hull and will ultimately reach the constructional parts bounding the cabin such as the floor, ceiling, side walls and divisional walls and luggage racks. These constructional parts excite internally the air within the passenger cabin.

SAE Paper 830736, "Fokker's activities in Cabin Noise Control for Propeller Aircraft", by E. H. Waterman, D. Kaptein and S. L. Sarin (April 1983), shows in diagrams of the cabin noise level as function of the frequency that are are dominant frequencies in the spectrum at the blade passing frequency and harmonics thereof. (The blade passing frequency is defined as the propeller revolution rate, in Herz, multiplied by the number of blades of each propeller).

The application of dynamic vibration absorbers embodied as mass-spring-devices, which for the larger part are tuned to the blade passing frequency but for a minor part are also tuned to the second or third harmonic thereof, will significantly reduce the vibrations on said frequencies in these parts of the airplane. Because the effective bandwidth of such mass-spring-devices is relatively small, it is important to maintain the revolution rate of each propeller by means of a revolution rate controller as precisely as possible on one and the same value, corresponding to the value to which the dynamic absorbers are tuned.

If furthermore a control system is used to maintain the mutual phase relationships of the propeller at predetermined fixed values then a situation may be obtained in which the noise fields in the cabin, originating from the various propellers, have a predetermined mutual phase difference causing destructive interference and resulting into a reduction of the noise level.

For further details the attention is drawn to a number of articles:
- report of AIAA, 84-2370, "Noise Control Characteristics of Synchrophasing, an Experimental Investigatin", Proc. of the Aeroacoustics Conference, October 1984.
- report of AIAA, 84-2369, "Noise Control Characteristics of Synchrophasing, an Analytical Investigation", Proc. of the Aeroacoustics Conference, October 1984.
- Report of AIAA, 83-0717, "Synchrophasing for Cabin Noise Reduction of Propeller-driven Airplanes", Proc. of the Aerocoustics Conference, April 1983.

A system of the type mentioned in the heading paragraph, destined for controlling the revolution rate of a number of aircraft engines is already described in the European patent applications EP 0,221,002 and EP 0,221,003, respectively U.S. Pat. Nos. 4,653,981 and 4,659,283. These prior art systems are based on the master-slave-principle, whereby one of the engines is functioning as master and all the other engines are adjusted as slave in relation to this master engine. Each deviation in the momentary position of the slave propeller is corrected by the system in relation to the master propeller.

Deviations in the propeller positions may result from changing airloads on the propeller blades caused by movements of the airplane and by short irregularities in the internal combustion engines powering these propellers.

To correct the phase difference in general an hydraulical-mechanical propeller blade pitch control system will be used to adjust the baldes of the slave propellers such that because of this adjustment the propelling power is temporarily increasing or decreasing resulting into a temporary decrease or increase respectively of the revolution rate. Propeller blade adjusting systems are known as such to the expert in this field and will therefor not be described in detail. It is unavoidable that such a control system has a certain inertia. This inertia should be kept as small as possible to maintain the eventual phase differences between certain limits whereby the synchrophasing indeed results into a noise reduction.

Although under ideal circumstances such systems can function satisfactorily the revolution rate of the master propeller will in general show deviations caused by turbulences etc. The synchrophasing control system will try to control the slave propellers such that they follow these deviations. In practice it appears not always possible to avoid that one or more of the slave propellers becomes out of phase in relation to the master propeller resulting into an increase in the noise level within the cabin. In many cases during turbulent flight conditions it is even preferable to switch off the synchrophasing control system because the irregular phasing and non-phasing of the propellers leads to audible changes in the noise level which is experienced by the passengers as very annoying. Furthermore the strong control activity of the system leads to a load on the gears and oil seals of the propeller blade adjusting mechanisms and the propeller blade construction itself.

An object of the invention is not to provide a control system for synchrophasing the propellers of an aircraft embodied such that the desired phase difference between all propellers of the aircraft can be maintained without too strong control signals appearing in the system resulting in a heavy load of the mechanical parts of the system, caused by disturbences in the revolution rate of one or more propellers under the influence of air turbulences, changing of the flight mode etc.

In agreement with said object the system of the invention now provides a control system for synchrophasing the propellers of an aircraft, each propeller provided with a blade pitch controller for controlling the blade angle of the propeller, the system containing for each propeller a control loop, comprising:
  a revolution rate controller, generating an output signal to the blade pitch controller,
  means for determining the blade passing frequency of the propeller,
  an adjustable propeller revolution rate reference source supplying a setpoint control signal,
  comparator means for comparing the blade passing frequency with said setpoint to generate a speed error signal for said revolution rate controller,
the control system furthermore comprises for each propeller:

means for determining the position of the propellor blades, a reference signal source, adjustable means for deriving a selected phase reference signal from said reference signal source by changing the phase thereof, a comparator to compare the sensed position of the propeller blades with said phase reference signals, providing a phase error signal to be combined with said speed error signal, and that the system furthermore comprises means to adjust said propeller revolution rate reference source and said phase reference signal deriving means such that for each revolution rate setpoint a predetermined mutual phase relationships between the propellers is maintained.

Preferably the system comprises furthermore a low pass filter and an amplitude limiter to remove unwanted frequencies from the control signal and to limit the amplitude thereof such that the actuators within the blade pitch controller are maintained within their normal response range.

The invention will be explained in more detail with reference to the accompanying drawings.

Figure 1:
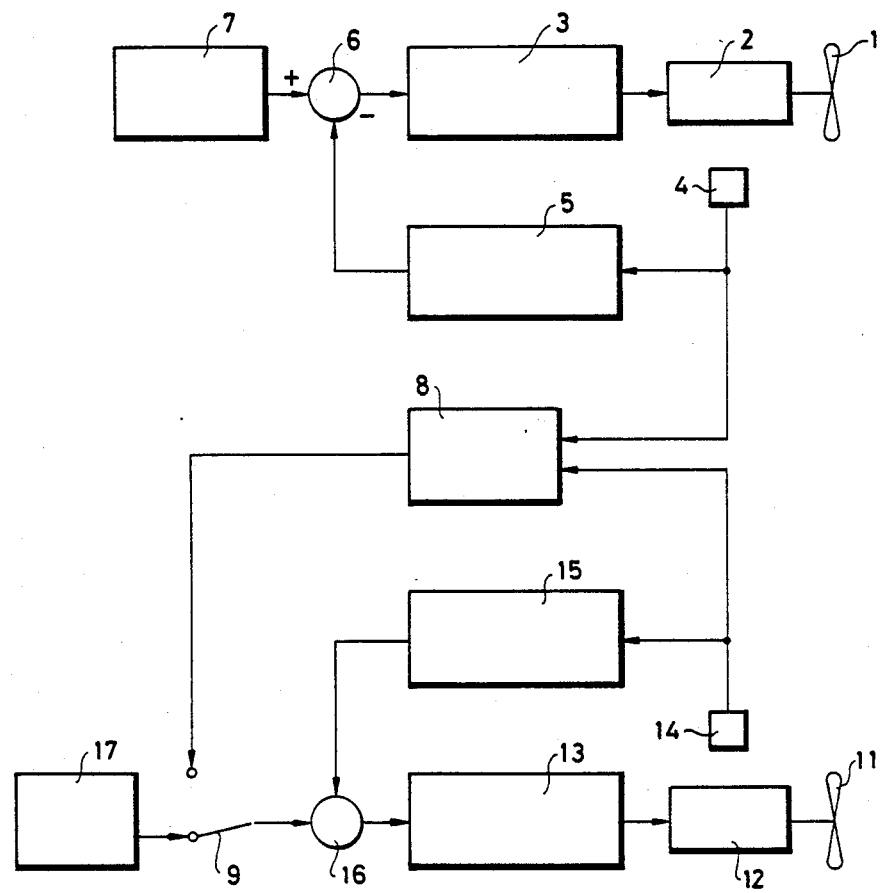
FIG. 1 illustrates a simplified diagram of a master-slave system of the type described in the European patent application 0,221,002, which system is above mentioned as a typical prior art system.

FIG. 1 illustrates schematically a prior art system destined for application in an airplane with at least two propellers. In this figure the propellers with their shafts are indicated by 1 and 11. The engines driving said propeller shaft are respectively indicated by 2 and 12. The revolution rate of the engine 2 and therewith of the propeller 1 is controlled by a revolution rate controller 3. The blade passing frequency (equal to the revolution rate of the propeller 1, measured in Herz, multiplied by the number of blades of the propeller) is detected by means of a detector 4, supplying an output signal to a measuring signal convertor 5. The measuring signal convertor 5 delivers a signal, related to the blade passing frequency, to a summing point 6 to which furthermore a signal of the reference source 7 is supplied. If there is a difference between both signals supplied to this summing point 6 then an error signal is delivered to the revolution rate controller 3.

A similar revolution rate control loop is present for propeller 11. The engine 12 of propeller 11 is controlled by the revolution rate controller 13. The blad passing frequency of propeller 11 is detected by a detector 14 supplying an output signal to a measuring signal convertor 15. The output signal of the measuring signal convertor 15 is in a summing point 16 compared with the output signal of the reference source 17 and in case there is a difference between both signals an error signal is supplied from the summing point 16 to the propeller revolution rate controller 13.

In the synchrophasing mode of the system the output signals of both detectors 4 and 14 are furthermore supplied to a phase comparator 8 comparing the phases of both signals and generating a phase difference dependent signal which can be supplied to the summing point 16 through switch 9. If the phase difference is deviating from a predetermined value then the controller 13 is controlled such that temporarily the revolution rate of the propeller 11 is increased or decreased to bring the propeller 11 back to such a phase condition that again the predetermined phase difference between the propellers 1 and 11 is obtained.

In the above described system the propeller 1 is functioning as master propeller whereas the propeller 11 is functioning as slave propeller. As already indicated above a master-slave system of this type has in practice a number of disadvantages, for which the invention will offer a solution.

Figure 2:
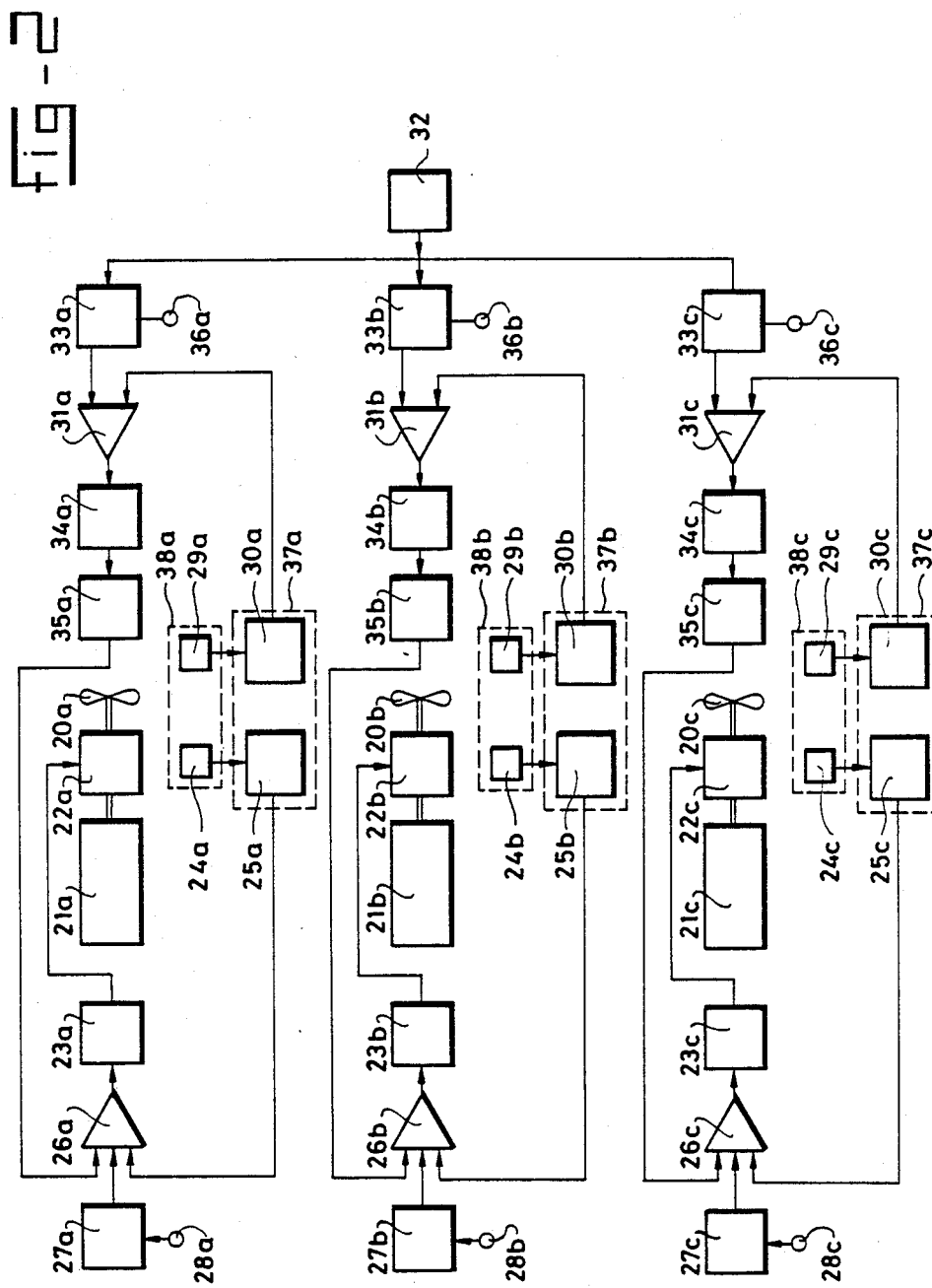
FIG. 2 illustrates a first embodiment of the system according to the invention, applicable in an airplane with two or more propellers, each driven by a separate engine.

FIG. 2 illustrates a synchrophasing control system according to the invention destined for application in airplanes with two or more propellers. In the figure a total of three control loops for three different propellers are illustrated. However, it will be clear that this type of control system can be used for any number of propellers.

The three propellers are indicated by 20a, 20b and 20c and the engines driving these propellers are respectively indicated by 21a, 21b and 21c. Between the engine 21a and propeller 20a a propeller blade pitch control mechanism 22a is installed to adjust the momentary blade position or pitch of propeller 20a. Similar propeller blade pitch control mechanisms 22b and 22c are installed between respectively engine 21b and propeller 20b and between engine 21c and propeller 20c.

The controller 22a of propeller 20a is controlled by the revolution rate controller 23a. The blade passing frequency or revolution rate of the propeller 20a is detected by a detector 24a supplying a signal to the measuring signal convertor 25a which delivers at his output a blade passing frequency or revolution rate related signal which is transferred to the comparator 26a in which this signal is compared with a setpoint signal derived from a propeller revolution rate reference source 27a. The reference source 27a is controlled through the input 28a by an external set point control signal which may vary dependent on the flight modes such as take-off, cruise, go-around, landing, etc. In modern aircraft the signal on the input 28a will be supplied by a board computer under control of the pilot.

A further detector 29a is used to continuously determine the momentary position of the blades of the propeller 20a. The detector 29a supplies an output signal to the measuring signal converter 30a which delivers at his output a blade position related signal which is transferred to a comparator 31a. In the comparator 31a the output signal of the converter 30a is compared with the output signal of a reference signal source 32 which is supplied through a phase offset-unit 33a to the other input of the comparator 31a. If there is a difference between the signals on both inputs of the comparator 31a then a phase correction signal will be generated and via the low pass filter 34a and the limiter 35a supplied to the comparator 26.

The phase offset-unit 33a has a second input 36a to which a predetermined phase offset signal is supplied. Also this phase offset signal will in modern aircraft be supplied by a board computer, controlled by the pilot, and will be related to a predetermined noise level in the passengers cabin.

It will be clear that the propeller control circuit described sofar comprises in fact two control loops, one loop for controlling the blade passing frequency and one loop for controlling the propeller phase. In the first loop, comprising the elements 23a, 24a, 25a, 26a, 27a and 28a the blade passing frequency is compared with an adjustable reference value and the engine is controlled in accordance with an eventual error signal. In the second loop, comprising the elements 26a, 29a, 30a, 31a, 32a, 33a, 34a, 35a and 36a the phase of the propeller (in other words the momentary position of the propeller blades) is compared with a standard value supplied by the reference source 31 and if necessary a correction signal is generated and supplied to comparator 26a, where interpreted in such a manner that the prescribed reference phase is maintained.

Although the low pass filter 34a and the limiter 35a are not essentially neccesary to apply the principles of the invention, both circuits are preferably used to avoid control signals with a too high frequency or a too high amplitude being supplied to the propeller blade pitch control mechanism 22a. The adjustment of the filter and limiter depends on the size and weight of the propellers as well as on the nature of the aerodynamic disturbances. The relative insensitivity of large propellers like the six bladed propeller of the Fokker 50 aircraft to aerodynamic disturbances because of its flywheel energy, makes a high reactivity of the synchrophasing system needless, even undesirable. Signals with too high frequency and/or too high amplitude resulting into unwanted responses of the blade pitch mechanism are therefore kept away from the pitch control mechanism.

As appears from FIG. 2 also the propeller 20b is controlled in a similar way as the propeller 20a and the control system of this propeller comprises components which are indicated by the same reference numbers, however, each number followed by a "b" instead of an "a".

The propeller 20c is also controlled in a similar way be a control system comprising the components which are indicated by 23c–30c, 32c and 33c, 34c to which also corresponding reference numbers, however, followed by a "c" instead of an "a".

Dependent on the flight mode (cruising, go-around, take-off and landing etc.) each of the control inputs 28a, 28b and 28c receive a predetermined signal for controlling the speed of the various engines 21a, 21c and 21c and herewith the blade passing frequency of the thereby driven propeller 20a, 20b and 20c. Such that each propeller has the same predetermined blade passing frequency.

Furthermore each of the control inputs 36a, 36b, and 36c receives a control signal which is determining the phase offset of the related propeller. Empirically, using a noise level detectors in the cabin of the aircraft, the phase offset for each propeller can be determined such that the total noise level in the cabin is rather low and is preferably minimal, for each of the various flight modes. The board computer will supply each input 36a, 36b or 36c with a specific reference signal dependent on the flight mode. These reference signals can be preprogrammed and stored into the memory of the board computer.

If one of the propellers 20a, 20b or 20c deviates from its desired phase position for one reason or another, then the related comparator 31a, 31b, or 31c will detect a difference between the output signal of the position detector and the signal of the reference source 32 and this will lead to the generation of a correction signal for the propeller blade pitch mechanism 22a, 22b or 22c such that within the limits set by the filter and limiter temporarily this mechanism will become active to bring the propeller back to the desired phase position. Each propeller is controlled from a common reference source independent of the other propellers. Only in relation to this reference source the predetermined phase position is selected and controlled.

By the use of independent controls for each of the propellers the above described problems relating to the prior art master-slave systems are prevented.

It will be clear that in practice both detectors 24a and 29a can be combined into one unit (indicated dash line 38a) for determining the momentary position of the propeller and for generating a thereto related signal, combined with a circuit for deriving from this signal a further signal related to the blade passing frequency. Also the converters 25a and 30a can be combined into one electronic circuit as indicated by the dash line 37a. These type of detectors and circuits are considered within reach of the average expert in this field. The same applies to the detectors 24b, 29b and 24c, 29c and the convertors 25b, 30b and 25c, 30c. The combined circuits are indicated by dash lines 37b, 37c, 38b, 38c.

Figure 3:
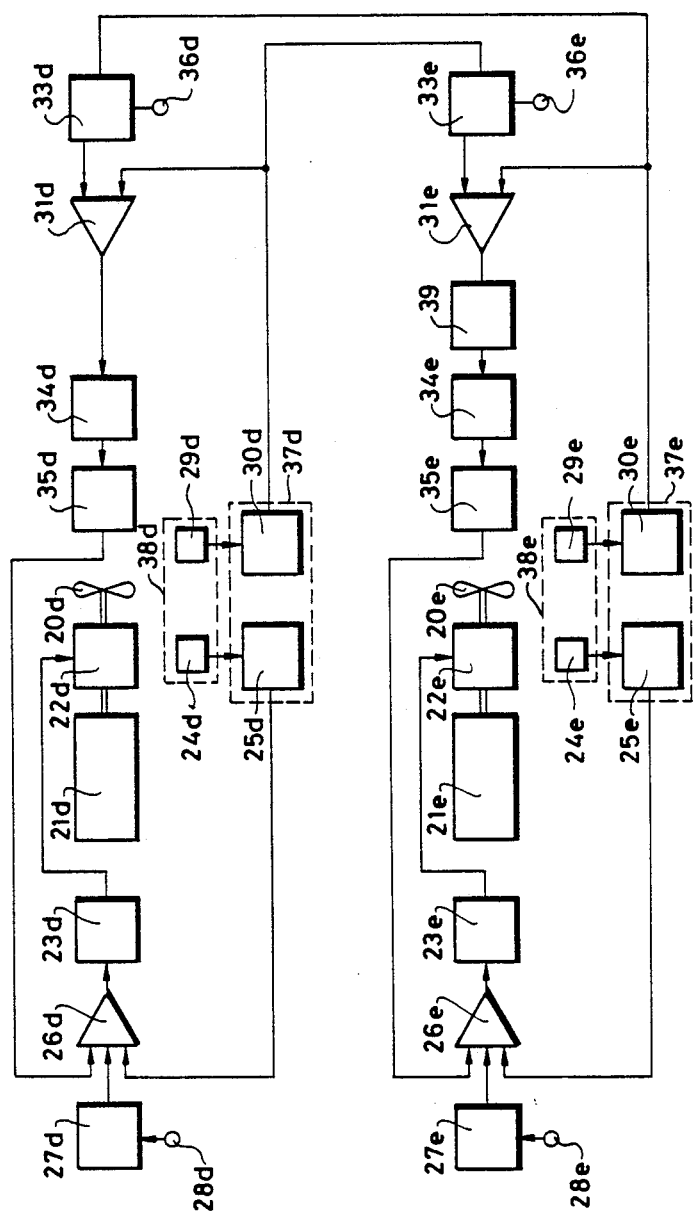
FIG. 3 illustrates schematically another embodiment of a control system according to the invention, specifically destined for application in an airplane with two propeller shafts or a multiple of two propellers, each driven by a separate engine.

FIG. 3 illustrates a further embodiment of a system according to the invention in which as reference signal for controlling the phase of each propeller not the signal from a separate reference source is used but the position detector output signal of the respective other propeller.

In FIG. 3 two propellers are indicated by 20d and 20e, each put through a propeller shaft to the respective engine 21d, 21e. Between each propeller and the corresponding engine a blade pitch control mechanism 22d, 22e is installed. In general the control loops for both propellers 20d and 20e are identical to the control loops in FIG. 2 and corresponding components and subcircuits are therefor indicated by the same reference numbers as used in FIG. 2, however, followed by respectively a "d" and "e". The actual difference resided in the signal applied to the phase offset units 33d and 33e. As appears from FIG. 3 the phase offset unit 33d receives the output signal from the converter 30e and the phase offset unit 33e, receives the output signal of the other converter 30d. Furthermore an invertor 39 is installed between the comparator 31e and the filter 34e. It is also possible to install this invertor between the comparator 31d and the filter 34d.

Because in each comparator 31d and 31e the propeller blade position of the related propeller is in fact compared with the propeller blade position of the other propeller, in case of a phase deviation both comparators 31d and 31e will supply an output signal of in principle the same value. The signal of the comparator 31d is through the filter 34d and the limiter 35d supplied directly to the comparator 26d. The signal of the comparator 31e, however, is first inverted in the inverter 39 and thereafter through the filter 34e and the limiter 35e supplied to the comparator 26e. The result thereof is that in case of a phase deviation the one propeller is controlled in an up-phase direction whereas the other propeller is controlled in a down-phase direction until both propellers are back to their nominal phase relationship.

Because both propellers are controlled in different directions it will take approximately half the time to correct an eventual phase deviation compared with the time needed in the circuit according to FIG. 2.

Although in the FIGS. 2 and 3 embodiments are illustrated in which each engine drives only one propeller, the principles according to the invention can also be applied in case one engine is used for driving more than one propeller. An embodiment comprising one engine driving two propellers is illustrated in FIG. 4.

Figure 4:
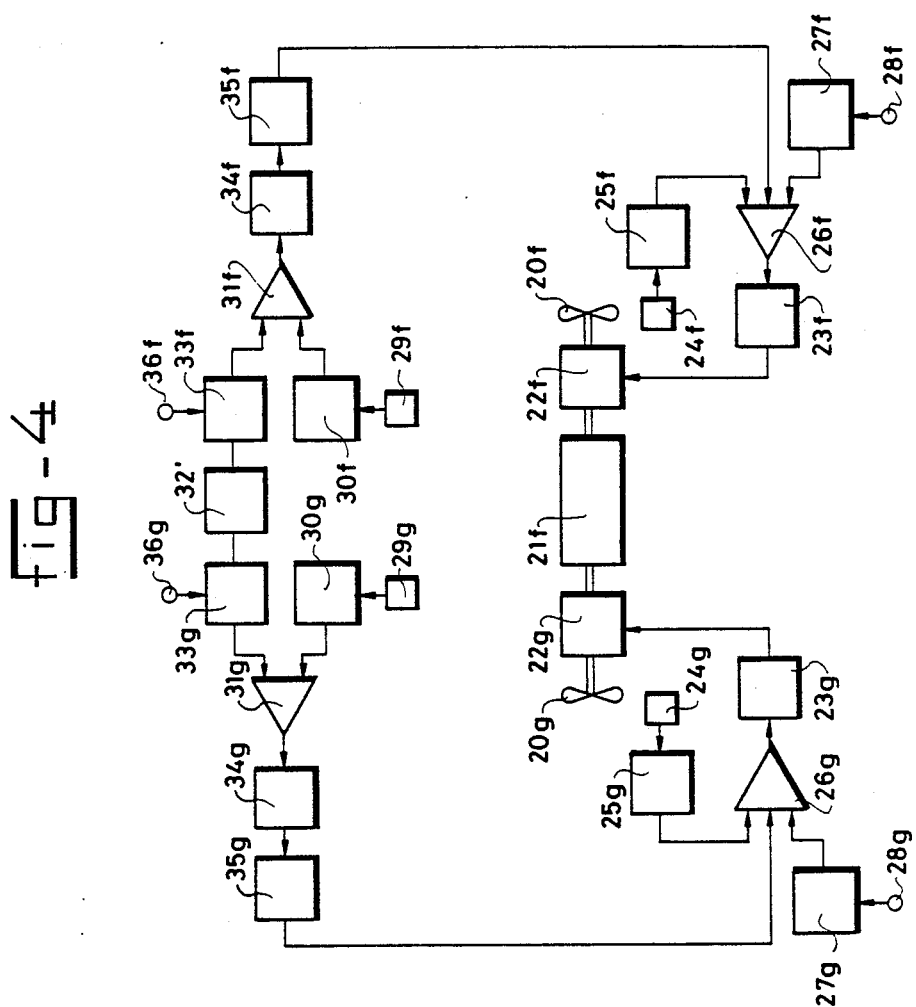
FIG. 4 illustrates schematically a further embodiment of a control system according to the invention, specifically destined for application in an airplane with two propellers both driven by the same engine.

The embodiment in FIG. 4 comprises one engine 21f and two propellers 20f and 20g. The propeller 20f is coupled to the engine 21f through a propeller blade pitch controller 22f and the propeller 22g is coupled to the engine 21f through a propeller blade pitch controller 22g. As will be clear from FIG. 4 the blade passing frequency of each propeller 20f and 20g is controlled by means of control loops comprising the component or circuits 23f, 24f, 25f, 26f, 27f, 28f and 23g, 24g, 25g, 26g, 27g, 28g. The functioning of these control loops is identical to the functioning described for the corresponding loops, identified by the same reference numbers in the embodiments illustrated in FIGS. 2 and 3. Each of the propeller blade pitch controllers 22g and 22f is controlled by control loops in a similar way as illustrated in FIG. 2. Furthermore one phase control loop comprises the components 26f, 29f, 30f, 31f, 33f, 34f, 35f and 36f, the other control comprises the components 26g, 29g, 30g, 31g, 33g, 34g, 35g and 36g. The phase signal offset units 33f and 33g receive a reference signal from a common reference source 32' which reference source has the same function as the reference source 32 and the embodiment of FIG. 2.

It will be clear that only one revolution rate of said signal at the input 28f is necessary to maintain the blade passing frequency of both propellers 20f and 20g at the numeral value and that furthermore two mutually related offset-signals are necessary at the inputs 36f and 36g to maintain a pretermined phase relationship between both propellers 20f and 20g.

I claim:

1. Control system for synchrophasing the propellers of an aircraft, each propeller provided with a blade pitch controller for controlling the blade angle of the propeller, the system containing for each propeller a control loop, comprising:

a revolution rate controller, generating an output signal to the blade pitch controller, means for determining the blade passing frequency of the propeller, an adjustable propeller revolution rate reference source supplying a revolution rate setpoint control signal, comparator means for comparing the blade passing frequency with said setpoint to generate an error signal for said revolution rate controller, the control system furthermore comprises for each propeller:

means for determining the position of the propellor blades, a reference signal source, adjustable means for deriving a selected phase reference signal from said reference signal source by changing the phase thereof, a comparator to compare the sensed position of the propeller blades with said phase reference signal, providing a control signal to be combined with the output signal of the revolution controller, and that the system furthermore comprises means to adjust said propeller revolution rate reference source and said phase reference signal deriving means such that for each revolution rate setpoint a predetermined mutual phase relationship between the propellers are maintained.

2. Control system according to claim 1, characterized in that said reference signal source is embodied as a highly stable frequency reference source.

3. Control system according to claim 1, characterized in that for each control loop the reference signal is derived from one and the same standard signal generator.

4. Control system according to claim 1, characterized in that in case the system is applied for two propellers of an aircraft the reference signal for the control loop for the one propeller consists of the propeller position signal of the other propeller and vice versa, whereby control signal for the propeller blade pitch controller in one of the control loops in inverted.

5. Control system according to claim 1 characterized in that the means for determining the blade passing frequency and the means for determining the position of the propeller blades, are combined into one circuit receiving an input signal from a position detector coupled to the propeller, the propeller shaft or part of the engine or pitch controller, and deriving therefrom a propeller blade position related signal as well as a blade passing frequency related signal.

6. Control system according to claim 1 characterized in that said control signal is passed through a low pass filter to cut off undesirable frequencies before it is combined with said error signal.

7. Control system according to claim 1 characterized in that said control signal is passed through an amplitude limiter, limiting the amplitude of the control signal before it is combined with said error signal.

8. A control system for synchrophasing propellers of a multipropeller craft having blade pitch controllers associated with each propeller, said system comprising, for each propeller:

(a) a revolution rate controller directing said blade pitch controller;

(b) a revolution rate comparator having an output directing said revolution rate controller;

(c) a revolution rate reference source with an output revolution rate reference signal that is inputted into said comparator;

(d) a revolution rate control loop comprising:

(i) a rate detector reading the revolution rate of the propeller and providing an output based upon said revolution rate; and (ii) a rate signal converter receiving the output of said rate detector and providing, as an output a revolution signal based on said rate detector output that is comparable to the revolution rate reference signal from said revolution rate reference source, said revolution signal directed to said comparator;

(e) a basic phase position reference signal;

(f) a specific position control signal, offsetting the basic phase position control reference signal;

(g) a position reference offset unit receiving said basic phase position reference signal and said specific position control signal and having a specific positioning output; and (h) a phase position control loop comprising:

(i) a position detector with an output based upon the position of said propeller;

(ii) a position signal converter receiving the output of said position detector and having an output based upon the position of said propeller that is comparable to the specific positioning output; and (iii) a position comparator receiving both said specific positioning output and said output based upon the position of said propeller, said position comparator having a phase output received by said revolution rate comparator, whereby said position comparator compares the position of a propeller relative to a desired control position and provides said specific positioning output directing correction of any discrepancy and said revolution rate comparator compares said revolution rate reference signal and said revolution signal output from said signal rate converter and has an output to said revolution rate controller to correct any discrepancy, said revolution rate comparator also directing the revolution rate controller to make adjustments based on input to said revolution rate comparator from said position comparator.

9. A control system as claimed in claim 8, wherein said specific positioning output from said position comparator passes through a filter and a limiter before reaching said revolution rate comparator.

10. A control system for synchrophasing propellers of a multipropeller craft having blade pitch controllers associated with each propeller comprising for each propeller:

(a) a revolution rate controller directing said blade pitch controller;

(b) a revolution rate reference signal;

(c) a revolution rate detector with a rate output signal;

(d) a specific position reference signal;

(e) a position detector with a position output signal;

(f) a position comparator receiving said specific position reference signal and said position output signal and having an output based on differences between said specific positions reference signal and said position output signal; and (g) a rate comparator receiving said revolution rate reference signal, said rate output signal and the output of said position comparator, said rate comparator having an output directing said revolution rate controller based upon differences between said revolution reference signal and said output signal and also on said output of said position comparator.

11. Control system as claimed in claim 8, wherein in a case where the system is applied to two propellers of a craft, the reference signal for the specific position control loop for the one propeller consists of the propeller position signal of the other propeller and vice versa, whereby position comparator output signal for the propeller blade pitch controller in one of the control loops in inverted.

12. Control system as claimed in claim 8, wherein the means for determining the blade passing frequency and the means for determining the position of the propeller blades, are combined into one circuit receiving an input signal from a position detector coupled to the propeller, the propeller shaft or part of the engine or pitch controller, and deriving therefrom a propeller blade position related signal as well as a blade passing frequency related signal.

13. Control system as claimed in claim 8, wherein said specific positioning output signal is passed through a low pass filter to cut off undesirable frequencies before it is combined with said error signal.

14. Control system as claimed in claim 8, wherein said specific positioning output signal is passed through an amplitude limiter, limiting the amplitude of the control signal before it is combined with said error signal.

15. Control system as claimed in claim 10, wherein in a case where the system is applied to two propellers of a craft, the reference signal for the specific position control loop for the one propeller consists of the propeller position signal of the other propeller and vice versa, whereby the position comparator output signal for the propeller blade pitch controller in one of the control loops in inverted.

16. Control system as claimed in claim 10, wherein the means for determining the blade passing frequency and the means for determining the position of the propeller blades, are combined into one circuit receiving an input signal from a position detector coupled to the propeller, the propeller shaft or part of the engine or pitch controller, and deriving therefrom a propeller blade position related signal as well as a blade passing frequency related signal.

17. Control system as claimed in claim 10, wherein said specific positioning output signal is passed through a low pass filter to cut off undesirable frequencies before it is combined with said error signal.

18. Control system as claimed in claim 10, wherein said specific positioning output signal is passed through an amplitude limiter, limiting the amplitude of the control signal before it is combined with said error signal.

* * * * *